No. 728,779. PATENTED MAY 19, 1903.
C. W. SPICER.
CASING FOR UNIVERSAL JOINTS.
APPLICATION FILED SEPT. 2, 1902.
NO MODEL.
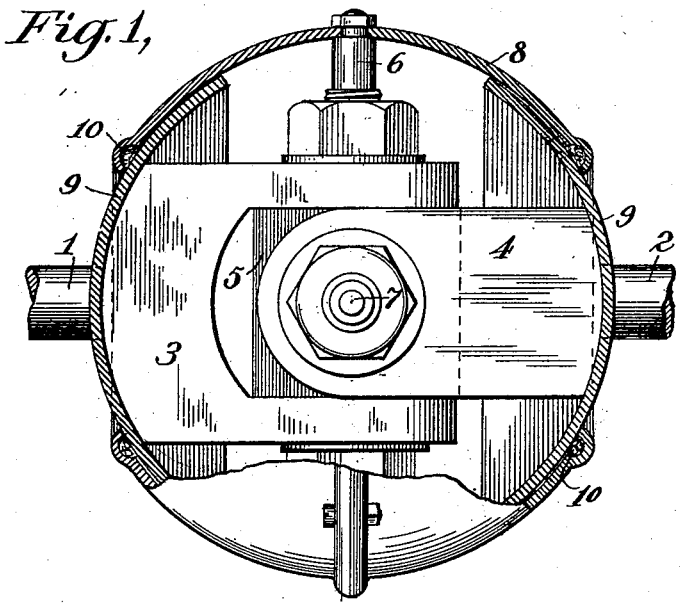
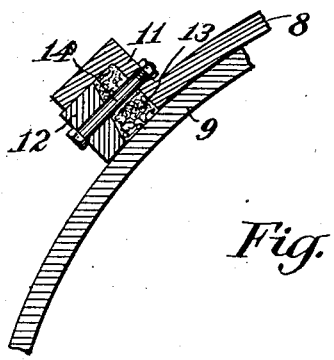
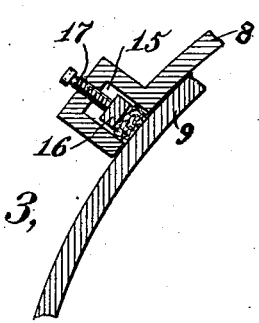
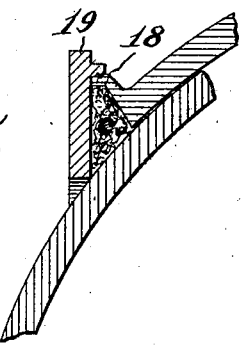
WITNESSES:
INVENTOR
BY
HIS ATTORNEYS No. 728,779. Patented May 19, 1903.

UNITED STATES PATENT OFFICE.

CLARENCE W. SPICER, OF ITHACA, NEW YORK.

CASING FOR UNIVERSAL JOINTS.

SPECIFICATION forming part of Letters Patent No. 728,779, dated May 19, 1903.

Application filed September 2, 1902. Serial No. 121,730. (No model.)

*To all whom it may concern:*

Be it known that I, CLARENCE W. SPICER, a citizen of the United States, residing at Ithaca, in the county of Tompkins and State of New York, have invented certain new and useful Improvements in Casings for Universal Joints; and I do hereby declare the following to be a full, clear, and exact description of the invention, such as will enable others skilled in the art to which it appertains to make and use the same.

My invention relates to improvements in universal joints, such as are employed for transmitting motion between shafts or other rotating objects the angle between which is variable; and my invention consists in novel means employed for covering such a joint and excluding dust and the like therefrom and in the use of packing between the members of such covering and in the novel means employed for setting up such packing.

Universal joints are extensively used in machine-tools and the like for transmitting motion from one shaft to another which occupies a variable position or angle with respect to the first. They are also used in the transmission-gear of many automobiles for transmitting motion from a spring-supported engine or motor to the driving-wheels. Various other uses for such joints are also well known. An objection to their use as heretofore constructed is that their wearing-surfaces are not efficiently protected from dust, metal chips and filings, and the like, for which reason the efficiency of such a joint often decreases rapidly and the bearing-surfaces and journals become worn and cut.

The object of my invention is to prevent dust, metal particles, and the like from reaching the wearing-surfaces of such joints without interfering with the free movement, rotative and angular, of the members of the joint.

I will now proceed to describe my invention with reference to the accompanying drawings, in which a universal joint fitted with one form of inclosing casing and various means for setting up the packing material of such casing are shown and will then point out the novel features thereof in claims.

In the said drawings, Figure 1 shows a side view of a universal joint provided with an inclosing casing, the latter being shown in partial section. Figs. 2, 3, 4, and 5 are detail views showing different means which may be employed for setting up the packing material, the parts of the casing being shown in section.

Referring now to the drawings, the universal joint itself consists of two members 1 and 2, of which either may be the driven member and the other the driving member. These members 1 and 2 terminate in jaws 3 and 4, set in planes at right angles and embracing between them a trunnion-block 5, to which the jaws 3 and 4 are pivoted by means of pivot-pins 6 and 7, set at right angles to each other. As is well known, such a joint permits transmission of rotary motion from either member 1 or 2 to the other, although said members are at an angle with respect to each other and although this angle changes during the rotation. This joint is inclosed by a shell 8 of spherical form, but having polar orifices of considerable extent, through which the shafts 1 and 2 project. This shell may be secured to one or both the pivot-pins 6 and 7, as preferred. It is sufficient to connect it to one of them. For convenience in assembling the parts of the joint it is preferable to form the casing in two parts, which may be secured together by screws and nuts, as shown. Each of the two members 1 and 2 of the joint carries a spherically-shaped cap 9, closing the polar orifice through which that member of the joint projects and adapted to move with respect to the casing 8 through a considerable angle while keeping such opening closed. The casing 8, with these caps 9, therefore completely incloses the working parts of the joint without interfering with free rotary motion of both members 1 and 2 of the joint and without preventing free angular motion of one of said members 1 and 2 with respect to the other. These caps 9 in themselves tend to hold the main portion 8 of the casing in place and in the absence of connection of such section 8 to one of the pivot-pins 6 and 7 would be sufficient for the purpose; but it is preferable to have such section 8 connected to one of the pivot-pins. To prevent the entrance of dust and the like, the casing 8 may be provided with grooved recesses 10, adapted to contain packing material. Such packing material effectually excludes dust and the like without interfering with free angular movement of one of said members 1 and 2 with respect to the other. The packing material also facilitates the lubrication of the joint by permitting a body of oil to be kept within the casing without material leakage or escape by capillarity or otherwise. The packing material employed may be felt or any other material suitable for the purpose.

It is sometimes desirable to provide means for compressing the packing material from time to time to take up wear. In such case one of the constructions shown in Figs. 2, 3, 4, and 5 may be employed. In the construction shown in Fig. 2 the casing 8 is provided with flanges 11, forming recesses for the reception of packing material, which recesses are closed in front by rings 12, arranged to be drawn up against the packing material 13 by means of bolts 14. The face of the ring 12 adjacent to the packing material is preferably inclined, so that as said ring is drawn up it tends to press the packing material down against the surface of the cap 9, thus tending to keep the joint between the casing 8 and cap 9 tight. In the construction shown in Fig. 3 the casing 8 is provided with grooved recesses 15 for the reception of the packing material, and a follower-ring 16 within this groove is arranged to be set up by screws 17, and thereby to press the packing material against the cap 9. Figs. 4 and 5 show the same construction, Fig. 5 being drawn to a larger scale than Fig. 4. According to the construction shown in these figures the casing 8 is provided with cylindrical flanges 18, over which flanged rings 19 are adapted to be screwed. The packing material is inclosed between the flange 18 and ring 19, and by screwing up said ring the packing material may be compressed and forced against the cap 9.

It is obvious that my invention is susceptible of various variations and modifications in construction and in arrangement of the parts, and I do not limit myself to the particular constructions herein shown and described.

What I claim is—

1. The combination, with a universal joint, of a casing inclosing the same having apertures through which the driving and driven members of the joint project and having spherically-curved surfaces in the vicinity of such apertures, and spherically-curved caps carried by the said driving and driven members of the joint, closing the said apertures and arranged to keep the same closed during angular movement of one of said members with respect to the other.

2. The combination, with a universal joint, of a casing inclosing the same of spherical form, having apertures through which the driving and driven members of the joint project, and spherically-curved caps carried by said driving and driven members but mounted concentrically with respect to the casing, and arranged to close the said apertures thereof.

3. The combination with a universal joint comprising driving and driven members and a trunnion-block to which said members are pivoted about axes at an angle with respect to each other, and a spherical casing inclosing said joint and carried by the trunnion-block, having apertures through which the driving and driven members project, and spherical caps carried by said driving and driven members and closing said apertures.

4. The combination, with a universal joint, of a casing inclosing the same having apertures through which the driving and driven members of the joint project and having spherically-curved surfaces in the vicinity of such apertures, and spherically-curved caps carried by the said driving and driven members of the joint, closing the said apertures and arranged to keep the same closed during angular movement of one of said members with respect to the other; and means, other than said caps, holding the casing in place.

5. The combination, with a universal joint, of a casing inclosing the same having apertures through which the driving and driven members of the joint project and having spherically-curved surfaces in the vicinity of such apertures, and spherically-curved caps carried by the said driving and driven members of the joint, closing the said apertures and arranged to keep the same closed during the angular movement of one of said members with respect to the other; and packing material between the caps and the main portion of the casing.

6. The combination, with a universal joint, of a casing inclosing the same having apertures through which the driving and driven members of the joint project and having spherically-curved surfaces in the vicinity of such apertures and recesses for the reception of packing material, and spherically-curved caps carried by the said driving and driven members of the joint, closing the said apertures and arranged to keep the same closed during angular movement of one of said members with respect to the other.

7. The combination, with a universal joint, of a casing inclosing the same having apertures through which the driving and driven members of the joint project and having spherically-curved surfaces in the vicinity of such apertures, recesses surrounding said apertures, for the reception of packing material, and spherically-curved caps carried by the said driving and driven members of the joint, closing the said apertures and arranged to keep the same closed during angular movement of one of said members with respect to the other; and means for compressing said packing material.

In testimony whereof I affix my signature in the presence of two witnesses.

CLARENCE W. SPICER.

Witnesses:
GEO. B. DAVIS,
WILLARD M. KENT.